Patented Feb. 4, 1947

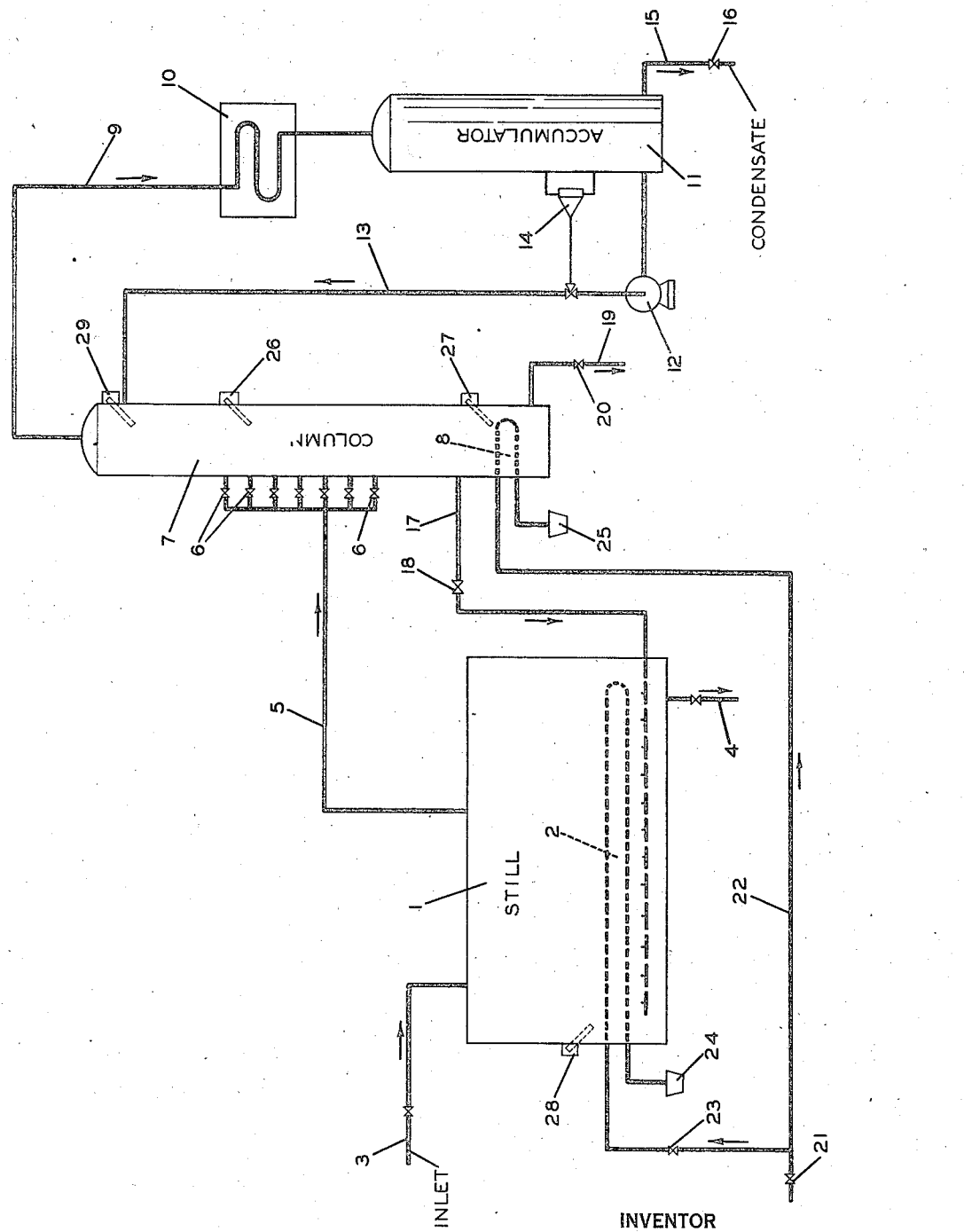

2,415,337

UNITED STATES PATENT OFFICE 2,415,337

BATCH RECTIFICATION

Samuel C. Carney, Bartlesville, Okla., assignor to Phillips Petroleum Company, a corporation of Delaware Application April 7, 1942, Serial No. 438,041

3 Claims. (Cl. 196—71)

This invention relates to batch distillation and, more particularly, it relates to an improvement in the batch distillation equipment and method of operating the same in chemical industries and in oil refineries and gasoline plants for the removal of certain materials, where due to the relatively small amount of material and desired product it is impractical and uneconomical to install the necessary elaborate equipment for the continuous distillation thereof. This invention applies specifically to the separation and recovery of such materials as improved octane number blending stocks, or such aromatics as benzene and toluene from stocks containing these, in a sufficiently concentrated form that the "concentrates" therefrom may be economically shipped to large, expensive, continuous plants for further concentration and refinement.

In the older batch distillation process a supply of liquid is charged into a still which is equipped with a rectifying column and part or, essentially, all of the initial charge is distilled overhead, and thus fractionated into at least two fractions, one of which may be a residuum remaining in the still. Batch rectification is still used in chemical industries, but in the petroleum industry, where nearly sixty per cent of the process equipment is rectifying equipment, batch rectification is now almost unknown. And, it is for use, mainly, in certain phases of the petroleum industry that my improved batch process has its greatest utility.

One object of this invention is to give greater utility, flexibility and speed of operation to the old batch distillation process and to render it, in improved form, useful in operations where otherwise it is considered obsolete.

Another object of my invention is to produce a distillation process for use in plants where quantities of certain products to be distilled are either relatively small or intermittent and a process requiring a minimum of equipment and investment.

Still another object of my invention is to produce a rectification process for small or intermittent quantities of raw or semi-finished materials requiring large reflux ratios with a minimum of equipment.

Still other objects and advantages will be apparent to those skilled in the art from a careful study of the following disclosure.

The field in which my process has utility over both the long known batch process and the more recent continuous process, lies in that class of problems where throughput is either relatively small or intermittent, where the rectification requires a large reflux ratio, as for example of the order of 10 to 1 or greater, and where the least valuable or the most valuable fraction of a charge stock lies intermediate in the boiling range of that stock, being neither the lightest nor the heaviest fraction of that stock. And especially in the petroleum industry, and, more particularly, in the natural gasoline branch of that industry, my process has utility in separating certain parts or members of the series of homologous hydrocarbons dealt with, whose value bears no simple relation to boiling point nor vapor pressure, such as those fractions whose chief value lies in the property of "octane number," or the property, even less related to boiling points, of "octane number blending value."

In isolated gasoline plants where it is impractical to combine the natural gasoline production with that of other plants for intensive rectification, in refinery vapor recovery plants, and in other relatively small operations such as small cracking plants, it is impractical to install the elaborate continuous equipment necessary to recover, for example, the valuable isomeric hydrocarbon fractions containing high octane number blending materials, or aromatics such as benzene and toluene from their major product stream. By my process, however, either such aromatic materials or isomeric blending materials may be separated, or recovered in a concentrate which may be shipped economically to a large, expensive, continuous installation for further rectification or refinement.

The attached drawing, forming a part of this specification, illustrates one embodiment of my apparatus for carrying out my improved batch rectification as herein disclosed.

Referring now to the figure, numeral 1 refers to a batch type still heated by heating element or heater 2. The charging material is introduced into the still 1 through line 3 at the beginning of each cycle and the residue or still bottoms withdrawn therefrom through drawoff line 4 at the end of said cycle. Vapors evolved from the charge by the heater 2 flow from the still through vapor line 5, and pass through one of the valves marked 6 onto the corresponding feed plate in column 7 which is a known and widely used plate type column. The particular valve 6 and corresponding plate used as the feed plate in any given operation are determined by the operator as best suited for the operation at hand. In the base of this column is heater 8. Overhead vapors flow by line 9 to condenser 10 and condensate collects in accumulator 11 from which reflux is pumped by pump 12 through line 13 and returned to the top of the column. The reflux is controlled by level controller 14. The top or overhead product (same composition as the reflux) is removed from the said accumulator by line 15 and its rate of withdrawal is controlled by valve 16. Some distilled material from the base of column 7 flows through line 17, as controlled by valve 18, back to still 1 while the remainder is removed as product through line 19 as controlled by valve 20. Steam or other heating medium in substantially constant amount for operation of the heaters 2 and 8, is delivered from a source, not shown, through valve 21 and flows by line 22 to heater 8. An amount of steam, as controlled by the operator, is taken from steam line 22 and passed through line 23 into heater 2 in the still. Water of condensation is removed from heaters 2 and 8 by traps 24 and 25. Thermometers or other temperature measuring devices are located within the still and column at strategic locations such as at points 26, 27, 28 and 29.

The elements of this combination are, of course, the known batch still and the known rectifying column, but the combination differs from the prior art in that column 7 is not the column heretofore combined with the batch still, which column was exclusively a "rectifying" column. My column 7, on the contrary, is one having a "rectifying section" above the selected feed plate, and a stripping section below the feed plate.

In starting a run, according to my invention, the charge of oil to be distilled is pumped into still 1 through charge line 3, valve 18 is closed, and all the heat turned into heating coil 2 to heat the charge rapidly to operating temperature. When condensate shows in accumulator 11, reflux pump 12 is started and the heat to coil 2 reduced, this heat then being turned into coil 8 in the bottom of the column. The unit is operated on total reflux until temperatures at points 29 and 26 indicate that the top product is of the desired composition. Product is then taken from accumulator through line 15 and run to storage, not shown, at a rate such that the temperature at 26 does not rise unduly, an appreciable temperature rise indicating the presence of higher boiling material in the top of the column. Intermediate product is meanwhile accumulating in the lower part of column 7 and the concentration of top column product in the still is being reduced. The removal of low boiling material from the charge is indicated by an increase in still temperature 28, and by an increase in bottom column temperature 27. As product is removed, the rate of taking said product of a given maximum end point from accumulator 11 is progressively reduced, and at a suitable time as indicated by temperature 27, higher boiling product is taken from the bottom of tower 7 through line 19.

As the level and volatility in still 1 are further reduced, valve 18 is partly opened to promote complete exhaustion of top tower product from the still. At this time heat to the still, as in coil 2, is further reduced, product withdrawn from the accumulator 11 reduced and bottom tower product withdrawn through line 19 increased. To complete the operation cycle on these three products, when top tower temperature 29 increases to that shown at 26 during most of the run, valves 16 and 18 are closed and the still bottoms discharged through drawoff line 4.

If it is desired to fractionate the charge into a number of cuts or fractions, the sequence as described is substantially repeated, the product formerly withdrawn through line 19 becomes top tower product, it is condensed in condenser 10, becomes reflux as circulated by pump 12 and product to be withdrawn through line 15 and transferred to its respective storage, not shown.

If, however, the still is to be emptied of its bottoms, column 7 may be operated idle while the still is emptied and recharged, after which the operation as above described is repeated.

In the embodiment in which many fractions are made from one charge, the cycle ends with the column 7 filled with the final heavy fraction and this fraction is merely taken back to the still at the beginning of a new cycle through line 17 and valve 18.

In another embodiment of my invention, the still 1 is only partially filled with the charge to be fractionated when heat is applied as in coil 2. Since the still has only one-half to one-fourth or even less of a full charge, heating up to distillation temperature is more rapid than when the still contains a full charge. During the heating of this partial charge, charge oil is continuously pumped into the still through charge line 3, and when the still temperature reaches a certain value, distillation begins as heretofore explained. Vapors pass from the still through vapor line 5 into column 7, fractionation takes place in the upper portion of the tower, and with heat in tower coil 8, stripping takes place in the bottom portion of the column, as explained previously. Condensate accumulates in accumulator 11, a portion of which is recycled as reflux and the remaining becomes product. While these fractionation and stripping operations are taking place in the column 7, more charge oil is being pumped into still 1, and while this charging is taking place the low boiling portion of this added charge distills off with that from the original part charge and is fractionated and stripped in a manner similar to the operation when starting with a full charge of oil. When the still 1 becomes filled to a certain stage or when the oil level in the still reaches a certain and predetermined height the charge line is closed to further flow of stock into the still. When this line 3 is thus closed, distillation, fractionation and stripping continues in an uninterrupted manner making product and reflux in 11 and accumulating intermediate product in the bottom of column 7. When temperature 27 and 28 increase, the said intermediate product may be withdrawn from the bottom of the column 7 through line 19.

When the temperature at point 29 increases to that registered at point 26 during most of the operation, heat is closed off from the still and column, the column and still drained of their product and bottoms respectively, and the still is then prepared for recharging of another batch.

By operating according to this latter embodiment, larger amounts of charge may be distilled in each batch and the length of "down" time required for charging the still is materially decreased, hence the ratio of "on stream" time to "down" time is increased which advantage may be reflected in the economics of the operation.

In the batch processes of the prior art, the vapor from the still was fed to the bottom plate of a "rectifying" column and the liquid from the bottom of this column was "all" returned to the still. In the simple distillations for which this prior art method was once used, such as separating gasoline and kerosene from crude oil, a very small reflux ratio was used and consequently very little liquid was so returned from the column to the still. But now the problems for which my present use of a batch method are suited, involve the use of a "very large reflux ratio" to separate, for example isohexane and isoheptane from normal hexane, materials which are available commercially in the heavier ends of natural gasoline. In the prior batch art, "all" the heat was applied to the still and "none" to the column, and "all" the reflux returned to the still. If, for example, a stock containing 25% of light component were batch distilled in that manner with a 20 to 1 reflux ratio, the distillate would in effect have to be distilled from 20×25+75=575% of the volume of the original charge, or 23 times the volume of the light component.

My present invention adds to the prior batch art the "stripping column" of the continuous distillation art, a point of improvement which has heretofore been overlooked. This improvement comprises, in part, adding to the column the heat necessary to vaporize reflux in place of adding this amount of heat to the body of charge oil in the batch still. In addition, there is returned to said still 1 through line 17 and valve 18 bottoms from column 7 from which all light component has been stripped and in an amount so limited by the operator as not to dilute unduly the material remaining in the still, the returned reflux being preferably in the vapor form.

The operating characteristics of the entire system are based on the method of heat supply. The constant flow of steam through valve 21 is set at a volume which produces vapor equal to the reasonable capacity of column 7. For regardless of whether the steam is used in heater 2 or in heater 8, vapor flows up column 7. Application of more or less heat to heater 2 makes the opposite change in heater 8 since their total remains essentially constant. The reflux ratio is controlled by the rate at which product is taken from the top of column 7 by valve 16. Since as in the batch operations, the composition at various points in the system is not constant, the temperatures at points 26, 27, 28 and 29, or other significant locations, indicate the composition of material there present, at that time.

It is true that in my process the skill of the operator is used rather than the rigid uniformity of all conditions maintained by automatic instruments in continuous rectification. Though in principle, capable of such use, it is not recommended, for example, for the separation of butane from isobutane, nor pentane from isopentane, but in the range from hexane to nonane whether derived from natural gasoline, or from refinery side streams there are so many paraffinic isomers and nonparaffinic constituents that their separation as individuals is impractical by essentially any process. The "octane number" and "octane number blending value" of the various fractions in this range can be learned, and has been learned empirically. In the broadest sense, my process furnishes an inexpensive and simple means for removing material from the middle of a fraction, as from the bottom of my column 7 through line 19, as heretofore set forth. The fraction so removed may in some cases be one of high value and in others, it may be for example normal heptane, whose removal increases the "octane number" of the residual product from line 4 and the overhead product from line 15.

It might be pointed out that the fraction from the base of column 7 is well rectified and stripped with respect to its lighter end, but that with respect to its heavier end, there is only the simple distillation of still 1 to keep out high boiling components. While the above statement is true, it might be mentioned that there is a difference of 50° to 60° F. between the boiling points of the normal paraffins from pentane to octane. These normal paraffins are of relatively low octane number, while the isomers and nonparaffins boiling between them are of higher octane values. As heretofore disclosed, the fraction from the base of column 7 is removed in a continuous manner when it is removed and that during certain parts of the cycle nothing is removed at this point. The operator controls the rate of vaporization from still 1 by the amount of heat he applies to heater 2 and he removes as product, the fraction from the base of the column 7, usually only during those periods when its octane number is quite low. The operator also has the option at any difficult point in the cycle to discontinue taking a bottom fraction from column 7 and to take only the overhead product, in which case, the full power of the column is available to control both the light and heavy ends of a fraction so taken.

It will also be understood by one skilled in the art that the material returned to the still through valve 18 has no necessary relation to the reflux ratio. The necessary relation is rather that the operator has at all times the three fold option of dividing the amount of material vaporized from the still between the top and bottom products of column 7 and the amount returned to the still through line 17. And in addition, he has control of the amount of material vaporized from the still and this is quite independent of whether the column is operated at a high or low reflux ratio.

Three operating variables of the herein disclosed process unknown to the prior batch distillation art are (1) ability to divide the total heat used between the still and the column, while holding the total constant, (2) ability to control the amount of column bottoms returned to the still independent of the amount of reflux used in the column, and to return no reflux to the still when desired, as for example, at the beginning of a batch, (3) ability to return reflux to the still in the form of vapor when desired.

The new and useful results attained by my new combination of the old elements, as herein disclosed, is to permit the separation for use in aviation fuel and munitions, of isomeric blending material and toluene concentrates, from sources of supply too small to justify the installation of the elaborate continuous rectification plants otherwise necessary, and to economize in steel used for construction of rectifying equipment.

I do not wish to limit myself to the specific embodiments given, for these were merely examples, since my invention may find many and varied uses as will be appreciated by those skilled in the art, and that many variations and alterations may be made in the apparatus and method of operating the same without departing from the spirit and intended scope of my invention.

What I claim is:

1. A batch distillation process comprising the steps of charging a batch still with an oil stock, heating the oil stock to distillation temperature, passing the still vapors into a treating zone comprising a rectifying section and a stripping section at a point intermediate said rectifying and stripping sections; passing the distilled vapors into the rectifying section and rectifying therein said vapors to produce an overhead vaporous product and a liquid bottoms; passing said rectifier liquid bottoms into the stripping section and therein producing a stripper vapor and liquid stripper bottoms, heating said liquid stripper bottoms to facilitate said stripping action; and passing said stripper vapor in conjunction with the still vapors into said rectifying section; recycling a portion of said liquid stripper bottoms into the distilling charge stock as reflux and removing the remainder of the stripper bottoms; removing and condensing the rectifier overhead vapors, and recycling a portion of this condensate as rectifier reflux and removing the remaining condensate as product; continuing said distillation until the desired material has been distilled from the oil charge stock, and removing the still bottoms; the sum of the rates of heat supplied to the still and to the stripper bottoms being maintained substantially constant throughout the distillation of a batch of oil stock.

2. A batch distillation process for improving the octane number of natural gasoline containing normal heptane as one of its constituent hydrocarbons comprising the steps of heating a quantity of natural gasoline in a batch still to distillation temperature, passing the distilled vapors into a treating zone comprising a rectifying section and a stripping section at one of a plurality of inlet points in said rectifying section; rectifying the distilled vapors to produce overhead vapors and a liquid bottoms; passing said liquid bottoms into the stripping section and therein producing stripper vapor and stripper liquid bottoms, heating said liquid stripper bottoms to facilitate said stripping action, and passing the stripper vapors into the rectifier section; passing a portion of said liquid stripper bottoms into the distilling charge stock as reflux and removing the remainder of the liquid stripper bottoms as a normal heptane product; removing and condensing the rectifier overhead vapors and recycling a portion of this condensate as rectifier reflux; continuing said distillation until the normal heptane has been substantially completely removed from the natural gasoline charge stock, and removing the still bottoms and combining same with the remainder of the rectifier overhead condensate to form a natural gasoline of improved octane number; the sum of the rates of heat supplied to the still and to the stripper bottoms being maintained substantially constant throughout the distillation of a batch of said natural gasoline.

3. A batch distillation process for removing toluene from hydrocarbon stocks containing toluene as a constituent comprising the steps of heating a quantity of toluene containing stock in a batch still to distillation temperature, passing the distilled vapors into a treating zone comprising a rectifying section and a stripping section at one of a plurality of inlet points in said rectifying section; rectifying the distilled vapors to produce overhead vapors and a liquid bottoms; passing said liquid bottoms into the stripping section and therein producing stripper vapor and a liquid stripper bottoms, heating said liquid stripper bottoms to facilitate said stripping, and passing the stripper vapors into the rectifier section; passing a portion of said liquid stripper bottoms into the distilling charge stock as reflux and removing the remainder of the liquid stripper bottoms as a toluene concentrate product; removing and condensing the rectifier overhead vapors and recycling a portion of this condensate as rectifier reflux; continuing said distillation until the toluene has been substantially completely removed from the charge stock and removing the still bottoms and combining same with the remainder of the rectifier overhead condensate to form a hydrocarbon stock substantially free of toluene; the sum of the rates of heat supplied to the still and to the stripper bottoms being maintained substantially constant throughout the distillation of a batch of said hydrocarbon stock.

SAMUEL C. CARNEY.

REFERENCES CITED

The following references are of record in the file of this patent:

UNITED STATES PATENTS

| Number | Name | Date |
| --- | --- | --- |
| 2,224,925 | Potts | Dec. 17, 1940 |
| 2,159,621 | Van Dyck | May 23, 1939 |
| 2,038,314 | Rugatz | Apr. 21, 1936 |
| 1,916,349 | Van Ackeren | July 4, 1933 |
| 1,851,550 | Tutle | Mar. 29, 1932 |
| 1,652,886 | Black | Dec 13, 1927 |
| 1,951,383 | Youker | Mar. 20, 1934 |
| 1,868,466 | Leslie, et al. | July 19, 1932 |
| 2,113,635 | Tiddy | Apr. 12, 1938 |
| 1,988,061 | Wagner | Jan. 15, 1935 |
| 2,055,455 | Taylor, et al. | Sept. 22, 1936 |
| 2,104,310 | Foelfsema | Jan. 4, 1938 |
| 1,595,666 | Knapp | Aug. 10, 1926 |
| 1,535,725 | Howard | Apr. 28, 1925 |
| 1,576,564 | Wellman | Mar. 16, 1926 |
| 1,904,196 | Bolles | Apr. 18, 1933 |

FOREIGN PATENTS

| Number | Country | Date |
| --- | --- | --- |
| 12,260 | Ellis (British) | of 1890 |